United States Patent [19]

Grierson et al.

[11] Patent Number: 4,872,996

[45] Date of Patent: * Oct. 10, 1989

[54] USE OF AMINOPHOSPHONIC ACIDS TO INHIBIT SCALE FORMATION AND CORROSION CAUSED BY MANGANESE IN WATER SYSTEMS

[75] Inventors: Jeffrey G. Grierson, Angleton; David A. Wilson, Richwood; Druce K. Crump, Lake Jackson, all of Tex.

[73] Assignee: The Dow Chemical Company, Midland, Mich.

[*] Notice: The portion of the term of this patent subsequent to Feb. 3, 2004 has been disclaimed.

[21] Appl. No.: 148,809

[22] Filed: Jan. 27, 1988

Related U.S. Application Data

[63] Continuation-in-part of Ser. No. 25,420, Mar. 13, 1987, abandoned.

[51] Int. Cl.$^4$ ................................................. C02F 5/14
[52] U.S. Cl. ................................. 210/700; 252/180; 252/389.22; 422/15
[58] Field of Search ................................ 210/698–701; 252/180, 181, 389.21, 389.22, 389.53; 422/15, 16, 19

[56] References Cited

U.S. PATENT DOCUMENTS

| | | | |
|---|---|---|---|
| 2,396,938 | 3/1946 | Bersworth | 134/2 |
| 2,609,390 | 9/1952 | Bersworth | 260/500 |
| 2,961,311 | 11/1960 | Bersworth et al. | 210/700 |
| 3,214,454 | 10/1965 | Binser et al. | 260/429.9 |
| 3,288,896 | 11/1966 | Irani et al. | 252/180 |
| 3,331,773 | 7/1967 | Gunderson et al. | 210/701 |
| 3,336,221 | 8/1967 | Ralston | 210/700 |
| 3,434,969 | 3/1969 | Ralston | 210/700 |
| 3,674,804 | 7/1972 | Redmore | 252/175 |
| 3,720,498 | 3/1973 | Redmore | 21/2.5 |
| 3,743,603 | 7/1973 | Redmore | 252/180 |
| 3,859,211 | 1/1975 | Redmore | 210/54 |
| 3,954,761 | 5/1976 | Redmore | 210/729 |
| 4,051,110 | 9/1977 | Quinlan | 210/700 |
| 4,085,134 | 4/1978 | Redmore et al. | 252/180 |
| 4,229,294 | 10/1980 | Redmore et al. | 210/700 |
| 4,489,203 | 12/1984 | Wilson et al. | 544/337 |
| 4,493,771 | 1/1985 | Wilson et al. | 210/700 |
| 4,552,665 | 11/1985 | Ralston et al. | 252/180 |
| 4,640,818 | 2/1987 | Grierson et al. | 252/181 |

*Primary Examiner*—Peter Hruskoci

[57] ABSTRACT

A process for inhibiting the deposition of manganese in water systems by adding to the water a sufficient amount of an organic aminophosphonic acid to inhibit corrosion and scale resulting from undesirable manganese deposition.

12 Claims, No Drawings

USE OF AMINOPHOSPHONIC ACIDS TO INHIBIT SCALE FORMATION AND CORROSION CAUSED BY MANGANESE IN WATER SYSTEMS

CROSS REFERENCE TO RELATED APPLICATION

This application is a continuation-in-part of Application Ser. No. 025,420, filed Mar. 13, 1987 now abandoned.

BACKGROUND OF THE INVENTION

Two of the main problems which occur in hydraulic engineering are the corrosion of metals and the precipitation of scale forming metal salts in both treated and untreated cooling water systems. The corrosion of metals such as steel, aluminum, brass and copper which are commonly found in water systems, is primarily due to dissolved oxygen and carbon dioxide. Materials which remove oxygen such as sodium sulfite or hydrazine are not economical and are technically inadequate. The use of $Zn^{++}$ ion, chromates, molybdates, polyphosphates, orthophosphate, and organophosphates in cooling water to form protective films on metal surfaces is common in the industry. Chromates are very efficient corrosion inhibitors, but they are often environmentally undesirable due to well known toxic effects $Zn^{++}$ likewise has environmental problems and it also forms low solubility products with orthophosphate, hydroxide and carbonate which can produce sludge and desposits responsible for promoting corrosion. Polyphosphates are not as efficient as chromates and they are unstable in a cooling water environment in which they decompose by hydrolysis to ortho and pyrophosphates which often form sludge and deposits. Although organophosphonates provide some corrosion protection, they are not nearly as efficient as chromates.

The formation of insoluble scale-forming metal salts such as calcium phosphate, carbonate, and sulfate have also proven harmful to the overall efficiency of water conducting systems, e.g. deposits in lines and heat exchange equipment. Some of the factors that have been found to affect scale formation are temperature, the pH of the system, the alkalinity, the rate of heat transfer and the concentration and types of ions present. Manganese is readily dissolved as the manganous ($Mn^{++}$) ion in water that is free of oxygen and may be found in deep well waters at concentrations as high as 2–3 mg/l. Manganese can exist in several forms depending on the oxidation state, pH, bicarbonate-carbonate-OH equilibria, and the presence of other materials. Concentrations greater than about 0.05 mg/l have been reported to cause troublesome manganese deposition. Concentrations less than this however, can also cause problems by accumulating in a distribution system and then being released in higher concentrations at a later time if a change in the environment should occur, e.g. changes in pH, $CO_2$ content or alkalinity. Exposure to an oxidizing environment (aeration, chlorination) also may result in manganese deposition. Thus, for example, when low levels of manganese exist in cooling tower feed water, deposition can occur which subsequently results in serious corrosion problems.

Several classes of compounds have been used to control metal ions, e.g. aminocarboxylic acids are of particular importance in water treatment. U.S. Pat. No. 2,396,938 teaches the use of aminocarboxylic acids for treating a boiler both to remove scale and to prevent its formation. A method of simultaneously controlling ion concentration and pH using aminocarboxylic acids is disclosed in U.S. Pat. No. 2,961,311. Commercially available aminocarboxylic acids include nitrilotriacetic acid (NTA), ethylenediaminetetraacetic acid (EDTA), and diethylenetriaminepentaacetic acid (DTPA). These aminocarboxylic acids function by incorporating the metal ion into a ring structure, i.e. by chelation. Metal ions are usually controlled by aminocarboxylic acids on a stoichiometric basis.

The use of methylenephosphonic acid substituted alkylenepolyamines for metal ion control at less than stoichiometric amounts was suggested in U.S. Pat. No. 2,609,390. Later water dispersible polymeric amine chelating agents, which included alkylene phosphonate derivatives, were indicated as having "threshold" effects in scale inhibition applications in U.S. Pat. No. 3,331,773. This term is used to describe the use of the chelating agent in less than stoichiometric amounts. The diamine and polyamine methylenephosphonic acid derivatives are taught and claimed in U.S. Pat. Nos. 3,336,221 and 3,434,969, respectively. Some of the products disclosed in these two patents are available commercially and are recommended as threshold scale inhibitors for alkaline earth metal compounds such as alkaline earth metal carbonates, sulfates, and oxalates. Other patents which disclose heterocyclic nitrogen containing compounds which are useful as chelating agents and may be employed in threshold amounts to control the precipitation of alkaline earth metal salts are U.S. Pat. Nos. 3,674,804; 3,720,498; 3,743,603; 3,859,211 and 3,954,761. In a more recent patent, U.S. Pat. No. 4,229,294, the use of threshold amounts of amino compounds containing both phosphonic and hydroxypropylenesulfonic acid groups for alkaline earth metal scale inhibition is disclosed. The use of aminophosphonates to prevent corrosion of metals in water systems is disclosed by one of the inventors of this application in U.S. Pat. No. 4,640,818 in which such compounds are used in combination with them manganese ion. It is also shown in the '818 patent that in the absence of manganese, phosphonates such as diethylenetriaminepenta(methylenephosphonic acid) (DTPMP) are deleterious to copper or brass in water systems.

The stabilization of soluble manganese to prevent its precipitation is disclosed in U.S. Pat. No. 4,552,665 by the addition of a copolymer of acrylic or methacrylic acid with 2-acrylamido-2-methylpropylsulfonic acid or its methacrylamido analog. This copolymer is also said to be effective in combination with any water soluble polycarboxylate, polyaminophosphonate or phosphate.

In addition, certain non-nitrogen phosphonic acid derivatives of aliphatic acids are useful ion control agents. These can be prepared by reacting phosphorous acid with acid anhydrides or acid chlorides, e.g. the phosphonic derivatives of the anhydrides or chlorides of acetic, propionic and valeric acids, correspond to the formula

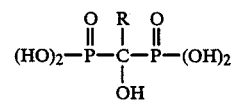

wherein R is a lower alkyl radical having 1 to 5 carbon atoms. The method of making and use of these products is described in U.S. Pat. No. 3,214,454. The use of threshold amounts to prevent calcium precipitation is disclosed and claimed therein. Representative of this type of product is the commercially available 1-hydroxyethylidene-1,1-diphosphonic acid (HEDP).

SUMMARY OF THE INVENTION

The invention is a process for inhibiting undesirable manganese deposition in water conducting systems by providing at least one of certain low molecular weight aminophosphonic acids, or salts thereof, to the water in the system.

DETAILED DESCRIPTION OF THE INVENTION

It has now been found that manganese, at concentrations and under conditions at which it will precipitate and promote corrosion in water conducting systems, can be controlled by the addition of certain aminophosphonic acids or their salts. Furthermore, some of the manganese in such aqueous systems is apparently converted and utilized in the formation of a protective corrosion inhibiting film on the metal surfaces.

The organic phosphonic acids which have been found useful in controlling manganese are aminophosphonic acids wherein the nitrogen and phosphorus are interconnected by an alkylene or substituted alkylene group.

The compounds can be prepared by a number of known synthetic techniques. Of particular importance is the reaction of compounds containing reactive amine hydrogens with a carbonyl compound (aldehyde or ketone) and phosphorous acid or derivative thereof. Detailed procedures can be found in U.S. Pat. No. 3,288,846 and such methods are incorporated herein by reference.

The following structural formulas represent some of the complexing ligands which can be used in the practice of the present invention:

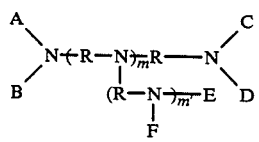

wherein substituents A, B, C, D, E and F are independently selected from hydrogen, —CH$_2$PO$_3$H$_2$ and

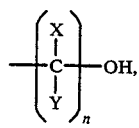

and salts of the phosphonic acid radical, wherein X and Y are independently hydrogen, methyl or ethyl radicals, n is 2 or 3 and m and m' each is 0–10, with the proviso that more than 50 percent of the amine hydrogens have been substituted by the phosphorus-containing group as previously defined herein, and wherein R is a linear or branched hydrocarbon residue which can be a heterocyclic or a substituted heterocyclic structure; with the further proviso that when m or m'≧1 the E and F substituents may be the same as or different from any other nitrogen atom and each R may be the same as or different from any other R.

Some specific, but non-limiting, examples of compounds which are included by the above structures are ethylenediaminetetra(methylenephosphonic acid) (EDTMP), diethylenetriaminepenta(methylenephosphonic acid) (DTPMP), hydroxyethylethylenediaminetri(methylenephosphonic acid) (HEEDTMP), pentaethylenehexamineocta(methylenephosphonic acid) and hexamethylenediaminetetra)methylenephosphonic acid).

Organophosphonic acid derivatives containing the hydroxylalkyl group in addition to the alkylenephosphonic acid group as a nitrogen substituent can be prepared by reacting a precursor amine with an alkylene oxide in aqueous medium, e.g. propylene oxide (1,2-epoxypropane), as described in U.S. Pat. No. 3,398,198. Thus, the precursor amines used as starting materials for the products employed herein are, for example, ethylenediamine, diethylenetriamine, triethylenetetramine, pentaethylenehexamine and the like polyamines having molecular weights up to about 275. The hydroxyalkylation reaction is performed prior to that which substitutes the alkylenephosphonic acid group for the hydrogen of the amine group.

For the purpose of the present invention, effective aminophosphonic acid derivatives described herein and salts thereof are considered equivalent. The salts referred to are the acid addition salts of those bases which will form a salt with at least one acid group of the aminophosphonic acid derivative. Suitable bases include, for example, the alkali metal and alkaline earth metal hydroxides, carbonates, and bicarbonates such as sodium hydroxide, potassium hydroxide, calcium hydroxide, potassium carbonate, sodium bicarbonate, magnesium carbonate and the like; ammonia, primary, secondary and tertiary amines and the like. These salts may be prepared by treating the aminophosphonic acid derivative having at least one acid group with an appropriate base.

The organic aminophosphonic acid derivatives employed according to the invention are also operable in the presence of other additives commonly used in the water of cooling systems, providing, of course, there is no adverse effect as a result of the use of such combinations. Some representative additives are dispersants, such as polyacrylates, polymethacrylates, polymaleic anhydrides, acrylate/methacrylate copolymers, acrylate/acrylamide copolymers, and acrylate/hydroxyalkylacrylate copolymers; biocides such as 2,2-dibromo-2-nitrilo-propionamide, bis(tributyltin)oxide, chlorine, chlorine dioxide and bromine chloride; antifoam agents and the like. Other agents such as phosphates, tolyltriazole and the like may also be present. In some cases, additional manganese may be added to aid in the formation of the protective corrosion inhibiting film.

EXAMPLE A (Control)

Tanks of 8 liter capacity are filled with water having the following characteristics:

| | |
|---|---|
| Conductivity (μmhos/cm) | 750 |
| Alkalinity (ppm as CaCO$_3$) | 120 |
| Total Hardness (ppm as CaCO$_3$) | 178 |
| Ca Hardness (ppm as CaCO$_3$) | 136 |
| Iron (ppm) | 0.28 |
| Manganese (ppm) (added as MnCl$_2$) | 5.0 |
| Sulfate (ppm) | 85 |
| Chloride (ppm) | 126 |
| pH | 7.4 |

Air is sparged at 10 SCFH through a glass tube which is situated at one end of the tank and extended to the bottom of the tank. The air sparge is used to recirculate the water, oxygenate the water, and aid in evaporation. Water level in the tank is automatically controlled by a gravity feed system and heat is added to the water by electric immersion heaters. The water temperature is measured by a platinum resistance temperature detector and controlled at 125° F. by an "on/off" controller which provides power to the two immersion heaters. The water is adjusted to pH 8.0 by addition of 50% caustic solution and is automatically maintained at that pH by a controller which feeds HCl to the tank in response to an increase in pH. Three carbon steel (1018) electrodes which are cleaned with 1:1 HCl and sanded with 320 grade sandpaper to remove all surface oxides are attached to the corrosion probes and immersed in the tanks. The corrosion rates are monitored using a potentiostatic corrosion rate instrument. The test is run for a period of five days at which time the concentration of salts in the bath is approximately four times that in the feed water. At the end of the test the final average corrosion rate from the run is found to be 10.0 mils per year (mpy).

EXAMPLE B (Comparative)

In the manner of Example A, an experiment is conducted in which 100 ppm of 1-hydroxyethylidene-1,1-diphosphonic acid (HEDP) is added to the tank. This is a commercially available product commonly used in water treatment. The final average corrosion rate from the run is found to be 8.2 mpy. Using the same test water, excluding manganese, and utilizing 100 ppm of HEDP the final average corrosion rate is 7.8 mpy.

EXAMPLE C (Comparative)

In another comparison conducted in the manner of Example A, 100 ppm of aminotri(methylenephosphonic acid) (ATMP) is added to the tank. This is another commercially available inhibitor commonly used in the water treatment area. The final average corrosion rate from the run is found to be 1.4 mpy. Utilizing 100 ppm of ATMP in the sample test water, excluding manganese, gives a final average corrosion rate of 1.0 mpy.

Examples 1–6, following, are examples of the invention.

EXAMPLE 1

Experiments are conducted in the manner of Example A, but with the addition of 100 ppm of DTPMP as the inhibitor. The final average corrosion rate from the run is found to be 0.5 mpy. An analysis of the probes indicates the presence of manganese in the protective film. Utilizing 100 ppm of DTPMP in the same water, excluding manganese, gives a final average corrosion rate of 2.5 mpy.

EXAMPLE 2

In the manner of Example A, to a tank containing 7.5 ppm of manganese in the water is added 150 ppm of DTPMP. The final average corrosion rate is found to be 0.36 mpy.

EXAMPLE 3

In the manner of Example A, 85 ppm of a phosphonomethylated Ethyleneamine E-100* (E-100-MP) is added to the water. The final average corrosion rate from the run is found to be 0.44 mpy.

*Ethyleneamine E-100 is a product of The Dow Chemical Company described as a mixture of pentaethylenehexamine and heavier ethyleneamines including piperazine structures with an average molecular weight of ~275.

EXAMPLE 4

Aminoethylethanolamine (AEEA) is phosphonomethylated and added to water at 100 ppm according to the procedure of Example A. The final average corrosion rate for carbon steel is 0.53 mpy.

EXAMPLE 5

A test is conducted according to the procedure of Example A except that Admiralty brass electrodes (Brass CDA-443) are used to determine the effects on corrosion rates of brass. The tests are run for 9 days instead of 5, and the water contains 10 ppm of manganese instead of 5 ppm. To this is added approximately 200 ppm of DTPMP. The final average corrosion rate is 0.25 mpy.

Experiments in U.S. Pat. No. 4,640,818 show that in the absence of manganese, diethylenetriaminepenta(methylenephosphonic acid) is deleterious to copper or brass in water systems.

EXAMPLE 6

An experimental pilot cooling tower unit of 350-gallon capacity is operated in accordance with the present invention in which the manganese ion ($Mn^{++}$) concentration is maintained from about 0.3 to about 0.6 ppm. The heat load on the system is maintained constant and corrosion coupons of carbon steel 1010 are placed in the circulating water. Chlorine, as a biocide, is continuously added to maintain the concentration of total chlorine in the range of from 1.0 to 2.5 ppm. DTPMP is used to control manganese deposition and scaling, and is added continuously during the test period. The system is monitored to determine alkalinity, hardness, pH, conductivity, the amount of soluble and total manganese present and the amount of DTPMP. Analyses for a seven-day experimental run is shown in Table I.

After four months of operation the system is opened and inspected visually. The corrosion coupons are analyzed by an energy dispersive X-ray technique. No evidence of manganese fouling is noted.

TABLE

| Day | DTPMP (ppm) | Total Mn (ppm) | Soluble Mn (ppm) | pH | Conductivity $\mu$mhos/cm | Total Alkalinity (ppm as $CaCO_3$) | Soluble $Ca^{++}$ Hardness (ppm as $CaCO_3$) |
|---|---|---|---|---|---|---|---|
| 1 | 15.7 | 0.397 | 0.351 | 8.1 | 4600 | 148 | 903 |
| 2 | 26.8 | 0.557 | 0.515 | 8.2 | 5000 | 169 | 962 |
| 3 | 19.5 | 0.466 | 0.394 | 8.3 | 4900 | 180 | 962 |

TABLE-continued

| Day | DTPMP (ppm) | Total Mn (ppm) | Soluble Mn (ppm) | pH | Conductivity μmhos/cm | Total Alkalinity (ppm as CaCO3) | Soluble Ca++ Hardness (ppm as CaCO3) |
|---|---|---|---|---|---|---|---|
| 4 | 16.1 | 0.399 | 0.386 | 8.3 | 4800 | 181 | 924 |
| 7 | 9.5 | 0.271 | 0.241 | 8.6 | 4800 | 370 | 933 |

We claim:

1. A process of inhibiting undesirable manganese deposition in water conducting systems which contain manganese at concentrations and under conditions such that the manganese will tend to precipitate as an insoluble compound and cause corrosion, the improvement which comprises adding to said water an organic aminophosphonic acid, wherein the nitrogen and phosphorus are interconnected by an alkylene or substituted alkylene radical, and having the formula

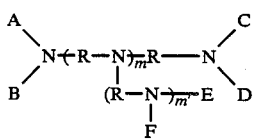

wherein substituents A, B, C, D, E and F are independently selected from hydrogen, —CH$_2$PO$_3$H$_2$,

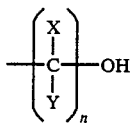

and salts of the phosphonic acid radical, wherein X and Y are independently hydrogen, methyl or ethyl radicals, n is 2 or 3 and m and m' each is 0–10, with the proviso that more than 50 percent of the amine hydrogens have been substituted by the phosphorus-containing group as previously defined herein, and wherein R is a hydrocarbon residue which can be a linear, branched, cyclic, heterocyclic or a substituted heterocyclic structure; with the further proviso that when m or m'≧1 the E and F substituents may be the same as or different from any other substituent of any other nitrogen atom and each R can be the same as or different from any other R.

2. The process of claim 1 wherein m is zero and R is —CH$_2$CH$_2$—.

3. The process of claim 2 wherein A, B, C and D are independently selected from hydrogen. —CH$_2$PO$_3$H$_2$ and salts thereof.

4. The process of claim 3 wherein substantially all of the substituent groups, A, B, C, and D are —CH$_2$PO$_3$H$_2$ or salts thereof.

5. The process of claim 1 wherein m is 1, R is —CH$_2$CH$_2$— and m' is zero.

6. The process of claim 5 wherein A, B, C, D and E are independently selected from hydrogen, —CH$_2$PO$_3$H$_2$ and salts thereof.

7. The process of claim 5 wherein substantially all of the substituent groups A, B, C, D, and E, are —CH$_2$PO$_3$H$_2$ or salts thereof.

8. The process of claim 1 wherein at least one of the nitrogen substituents is

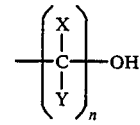

9. The process of claim 8 wherein X and Y each is hydrogen.

10. The process of claim 9 wherein n is 2 and substantially all the remaining nitrogen substituents are —CH$_2$PO$_3$H$_2$ or a salt thereof.

11. The process of claim 1 wherein the amine precursor of the aminophosphonic acid has an average molecular weight of about 275.

12. The process of claim 11 wherein substantially all of the amine hydrogens have been substituted by methylenephosphonic acid groups or salts thereof.

* * * * *